US00RE43717E

(19) United States
(12) Reissued Patent
DeForte et al.

(10) Patent Number: US RE43,717 E
(45) Date of Reissued Patent: Oct. 9, 2012

(54) INTERCONNECTING MUFFLE

(75) Inventors: Robert L. DeForte, Leominster, MA (US); Evgeniy E. Esjunin, Lowell, MA (US)

(73) Assignee: Saint-Gobain Ceramics & Plastics, Inc., Worcester, MA (US)

(21) Appl. No.: 29/386,455

(22) Filed: Mar. 1, 2011

Related U.S. Patent Documents

Reissue of:
(64) Patent No.: Des. 569,491
Issued: May 20, 2008
Appl. No.: 29/289,033
Filed: Jul. 2, 2007

(51) LOC (9) Cl. ..... 23-03
(52) U.S. Cl. ..... D23/386
(58) Field of Classification Search ..... D23/341, D23/354, 358, 363, 386, 393, 422, 499; D25/119, D25/120, 121, 122, 123, 124, 125; 55/497, 55/498, 502, 503, 505, 506, 521, DIG. 30; 126/19 R; 219/90, 405; 432/152, 153, 156, 432/200, 250, 253, 266
See application file for complete search history.

(56) References Cited

U.S. PATENT DOCUMENTS

| | | | | | |
|---|---|---|---|---|---|
| 1,520,408 | A | * | 12/1924 | Ebeling | 432/155 |
| 1,661,309 | A | | 3/1928 | Saxe | |
| 2,381,538 | A | | 8/1945 | Harris | |
| 2,383,353 | A | | 8/1945 | Steele | |
| 2,849,222 | A | * | 8/1958 | Senger | 432/249 |
| 3,582,054 | A | * | 6/1971 | Beck | 432/50 |
| 3,615,082 | A | * | 10/1971 | Beck | 432/266 |
| 3,621,169 | A | | 11/1971 | Heft et al. | |
| 3,749,882 | A | | 7/1973 | Pilkington et al. | |
| 3,859,041 | A | | 1/1975 | Winslow | |
| 3,980,028 | A | | 9/1976 | Ginsburg | |
| 4,032,290 | A | | 6/1977 | Soderlund et al. | |
| 4,213,753 | A | | 7/1980 | Negroni et al. | |
| 4,629,865 | A | * | 12/1986 | Freedman et al. | 219/405 |
| 5,577,157 | A | | 11/1996 | Sopori | |
| D417,725 | S | * | 12/1999 | Viscolosi | D23/354 |
| 6,270,305 | B1 | * | 8/2001 | Orbeck et al. | 414/157 |
| 6,392,203 | B1 | | 5/2002 | Schmidmayer | |
| 7,598,477 | B2 | * | 10/2009 | Smith | 219/390 |
| D655,804 | S | * | 3/2012 | Platt | D23/365 |
| 2006/0000196 | A1 | * | 1/2006 | Beier et al. | 55/497 |
| 2009/0301460 | A1 | * | 12/2009 | Schmidbauer et al. | 126/19 R |
| 2009/0301461 | A1 | * | 12/2009 | Taplan et al. | 126/19 R |

OTHER PUBLICATIONS

Crystolon muffle, as shown in on-line publication, "Refractories For Atmosphere Furnaces." (Undated). Downloaded from URL: www.refractories.Saint-Gobain.com Jun. 13, 2012. (6 pages, see p. 4).*

* cited by examiner

*Primary Examiner* — Karen E Eldridge Powers
(74) *Attorney, Agent, or Firm* — Abel Law Group, LLP; Christopher Cianciolo

(57) CLAIM

The ornamental design for an interconnecting muffle, as shown and described.

DESCRIPTION

The article is an interconnecting muffle for holding materials in a high temperature environment.

FIG. 1 is a front view of the interconnecting muffle embodying my new design;
FIG. 2 is a back view thereof;
FIG. 3 is a side view thereof, the opposite side being a mirror image;
FIG. 4 is a top view thereof, the opposite side being a mirror image; and
FIG. 5 is a perspective view thereof.
FIG. 6 is a front view of another embodiment of the interconnecting muffle;
FIG. 7 is a back view thereof; and,
FIG. 8 is a perspective view thereof.

1 Claim, 3 Drawing Sheets

Figure 2:
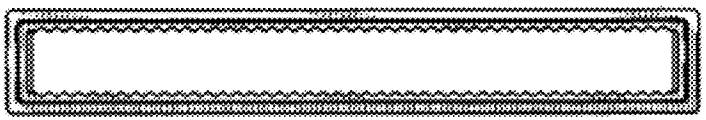
Figure 1:
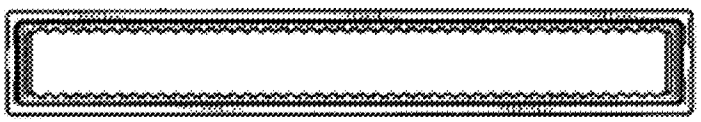
Figure 3:
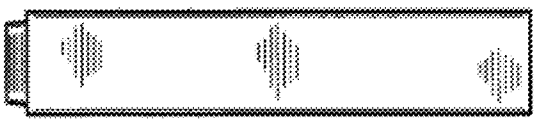
Figure 4:
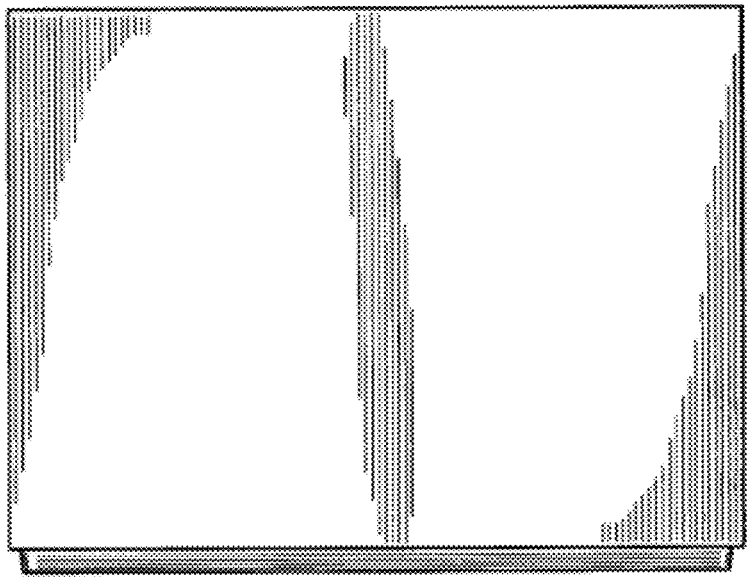
Figure 5:
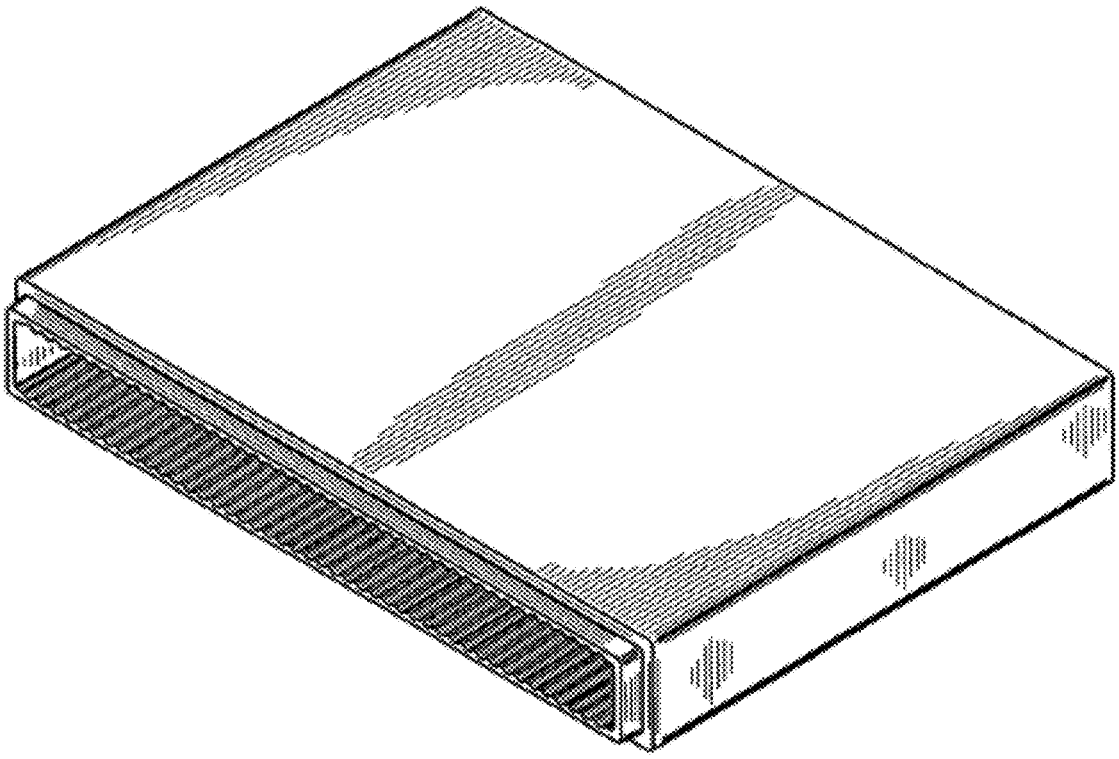
Figure 7:
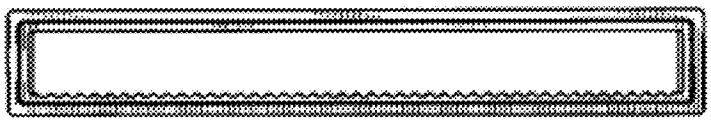
Figure 6:
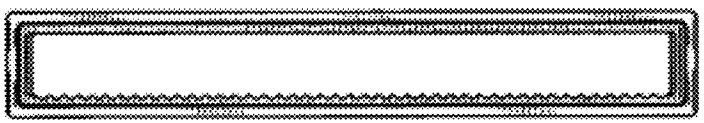
Figure 8:
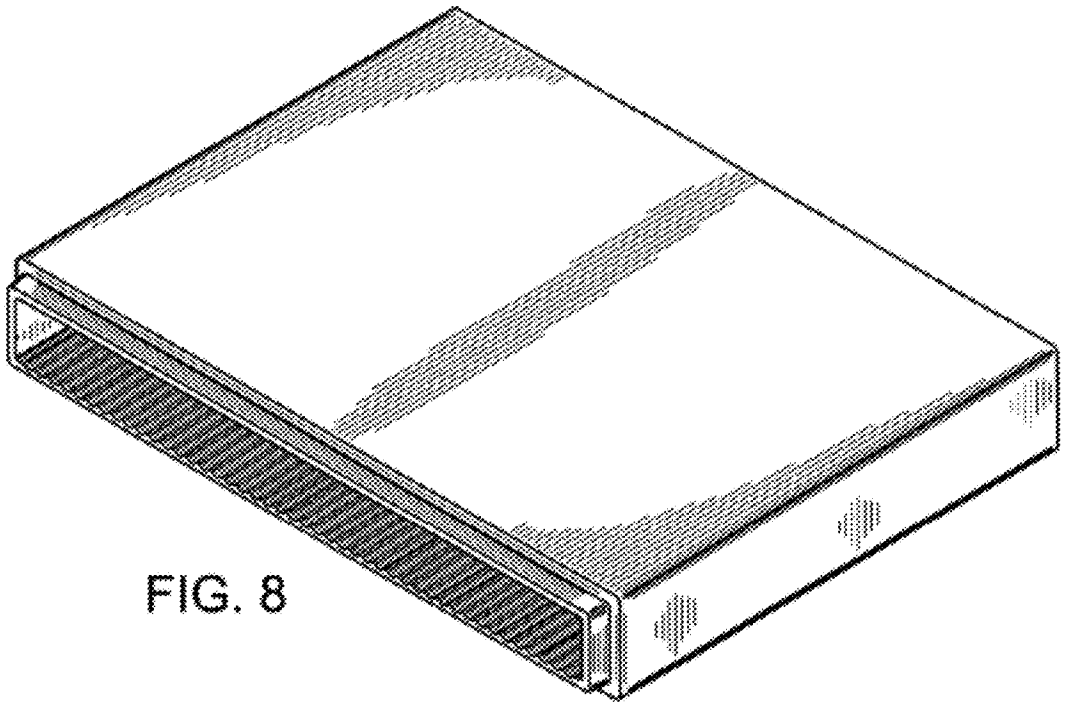

Matter enclosed in heavy brackets [ ] appears in the original patent but forms no part of this reissue; matter printed in italics indicates the additions made by reissue.